United States Patent
Braunwarth et al.

(10) Patent No.: US 8,663,466 B2
(45) Date of Patent: Mar. 4, 2014

(54) FLOW BAFFLE INSTALLATION METHODS AND APPARATUS

(75) Inventors: William F. Braunwarth, Eden Prairie, MN (US); Bonnie Brewer, Anoka, MN (US); Aaron Gendler, Edina, MN (US)

(73) Assignee: Upstream Technologies Inc, Chanhassen, MN (US)

( * ) Notice: Subject to any disclaimer, the term of this patent is extended or adjusted under 35 U.S.C. 154(b) by 273 days.

(21) Appl. No.: 13/080,890

(22) Filed: Apr. 6, 2011

(65) Prior Publication Data

US 2012/0255622 A1 Oct. 11, 2012

(51) Int. Cl.
*E03F 5/14* (2006.01)
*C02F 103/00* (2006.01)

(52) U.S. Cl.
CPC ............. *E03F 5/14* (2013.01); *C02F 2201/002* (2013.01); *C02F 2103/001* (2013.01)
USPC .... 210/170.03; 210/232; 210/521; 210/532.1

(58) Field of Classification Search
USPC ............ 210/162, 170.03, 232, 299, 305, 521, 210/532.1
See application file for complete search history.

(56) References Cited

U.S. PATENT DOCUMENTS

| | | | | |
|---|---|---|---|---|
| 4,157,969 A | * | 6/1979 | Thies | 210/521 |
| 4,689,145 A | * | 8/1987 | Mathews et al. | 210/170.03 |
| 4,957,621 A | * | 9/1990 | Rohloff | 210/232 |
| 5,405,539 A | * | 4/1995 | Schneider | 210/170.03 |
| 5,643,445 A | * | 7/1997 | Billias et al. | 210/162 |
| 6,955,756 B2 | * | 10/2005 | Fallon | 210/170.03 |
| 8,017,004 B2 | * | 9/2011 | Crumpler | 210/162 |
| 8,034,236 B1 | * | 10/2011 | Happel | 210/162 |
| 2003/0047497 A1 | * | 3/2003 | Harris et al. | 210/170 |
| 2012/0031851 A1 | * | 2/2012 | Gulliver et al. | 210/170.03 |

* cited by examiner

*Primary Examiner* — Christopher Upton
(74) *Attorney, Agent, or Firm* — Cardle Patent Law Chtd

(57) ABSTRACT

A method of flow baffle installation is disclosed herein. The method, in various aspects includes the steps of orienting a side support at a specified elevation about a sidewall of a sump using a leveling support, bolting the side support to the sidewall of the sump following the step of orienting a side support at a specified elevation about a sidewall of a sump using a leveling support, orienting an opposing side support at the specified elevation about the sidewall of the sump using a corresponding leveling support, bolting the opposing side support to the sidewall of the sump following the step of orienting an opposing side support at the specified elevation about the sidewall of the sump using a corresponding leveling support, adjusting an adjustable cross-member to span between the side support and the opposing side support. This Abstract is presented to meet requirements of 37 C.F.R. §1.72 (b) only. This Abstract is not intended to identify key elements of the apparatus and methods disclosed herein or to delineate the scope thereof.

9 Claims, 7 Drawing Sheets

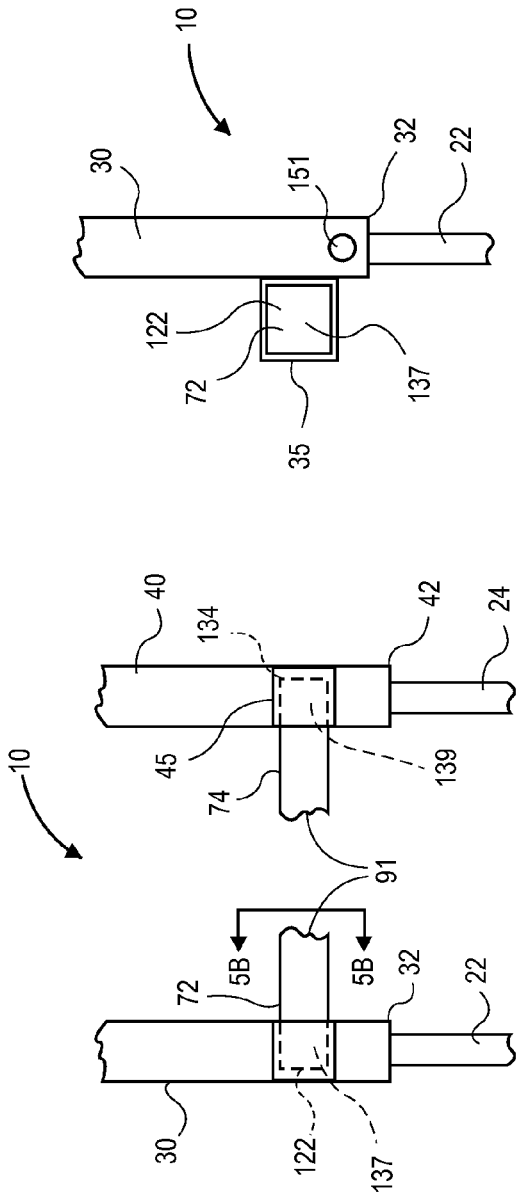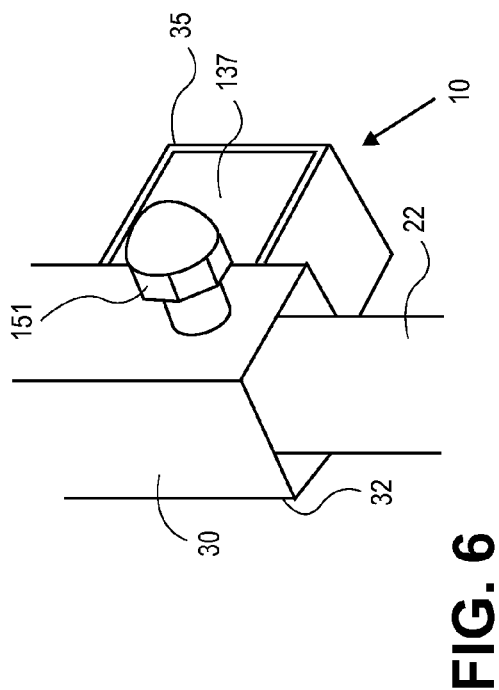

FLOW BAFFLE INSTALLATION METHODS AND APPARATUS

BACKGROUND OF THE INVENTION

1. Field

The apparatus, methods, and kits disclosed herein related to retrofit sumps to control the flow therein.

2. Background

Water such as, for example, storm water, sanitary wastewater, and other such flows may contain pollutants in the form of various settleable particulates. In various aspects, the water may be channeled through various existing pipes or other drainage channels that pass through one or more sumps. In order to control pollution, it may be desirable to utilize these existing sumps to capture particulates entrained in the water.

The flow velocity may decrease as the water passes through the sump, so that some of the particles entrained in the water may settle to the bottom of the sump. The particles settled to the bottom of the sump may be retained at the bottom of the sump, and may be removed from the bottom of the sump by periodic cleaning. However, large flows through the sump may re-entrain the particles before the particles are removed from the sump. Furthermore, the flow velocities and flow patterns in the sump may hinder the removal of particles from the water by settling. Various apparatuses that train the flow within the sump have been developed to be retrofit into existing sumps or fit into sumps generally as the sump is constructed in order to enhance particle removal by enhancing particle settlement in the sump and to prevent re-entrainment of particles into water flowing through the sump.

These existing sumps, in various aspects, may be a generally confined space with limited access through a manhole or other such entryway. The confined space with limited access may cause difficulty with retrofitting an existing sump with such apparatuses to control the flow.

Accordingly, there is a need for improvements in the apparatus that train the flow within the sump, as well as associated methods, and kits that facilitate the retrofit of existing sumps with such apparatus.

BRIEF SUMMARY OF THE INVENTION

These and other needs and disadvantages may be overcome by the apparatus, methods, and kits disclosed herein. Additional improvements and advantages may be recognized by those of ordinary skill in the art upon study of the present disclosure.

A method of flow baffle installation is disclosed herein. The method, in various aspects includes the steps of orienting a side support at a specified elevation about a sidewall of a sump using a leveling support, bolting the side support to the sidewall of the sump following the step of orienting a side support at a specified elevation about a sidewall of a sump using a leveling support, orienting an opposing side support at the specified elevation about the sidewall of the sump using a corresponding leveling support, bolting the opposing side support to the sidewall of the sump following the step of orienting an opposing side support at the specified elevation about the sidewall of the sump using a corresponding leveling support, adjusting an adjustable cross-member to span between the side support and the opposing side support.

A flow baffle installation kit is disclosed herein. In various aspects, the kit includes a side support adapted to attach to a sidewall of a sump, a leveling support adapted to be slideably received by the side support, an opposing side support adapted to attach to the sidewall of the sump, a corresponding leveling support adapted to be slideably received by the opposing side support, an adjustable cross-member configured to attach to side support and attach to the opposing side support, and a baffle adapted to attach to the adjustable cross-member.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

BRIEF DESCRIPTION OF THE DRAWINGS

FIG. 5A illustrates by elevation view portions of the exemplary flow baffle apparatus of FIG. 1A;

FIG. 5B illustrates by elevation view portions of the exemplary flow baffle apparatus of FIG. 1A;

FIG. 6 illustrates by elevation perspective view portions of the exemplary flow baffle apparatus of FIG. 1A;

Figure 1A:
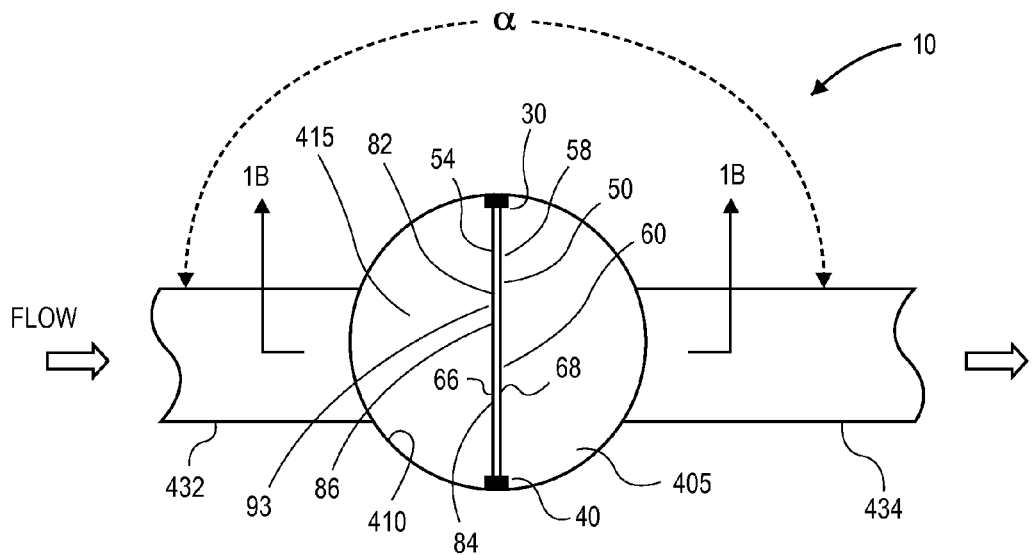
FIG. 1A illustrates by plan view an exemplary implementation of a flow baffle apparatus installed within a sump.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof.

DETAILED DESCRIPTION OF THE INVENTION

Methods of flow baffle apparatus installation along with associated flow baffle apparatus and kits are disclosed herein. The flow baffle apparatus may be positioned within a sump in order to train the flow within the sump, and the flow baffle apparatus may be formed for that purpose. The flow baffle apparatus may be secured to the walls of the sump in ways that may account for irregularities in the walls. The sump may be accessed through a manhole, and the methods of flow baffle apparatus installation, along with the associated flow baffle apparatus and kits, are designed to be implemented through manhole access, in various aspects.

FIG. 1A illustrates an implementation of flow baffle apparatus 10. As illustrated in FIG. 1A, flow baffle apparatus 10 is positioned in sump 405 to train the flow therein. Pipe 432 leads into sump 410 and pipe 434 leads from sump 410 so that flow may pass through pipe 432 into sump 410, pass about baffle apparatus 10, which is positioned within sump 410, and exit sump 410 through pipe 434. As illustrated, pipe 432 and pipe 434 are positioned generally opposite one another at angle α=180° in the horizontal plane. In other implementations, pipe 432 and pipe 434 may be positioned at other angles α in the horizontal plane with respect to one another, may have various sizes, may be set at various elevations with respect to sump bottom 415 including other benchmarks, or there may be additional pipes flowing into or out from sump 410.

Figure 2:
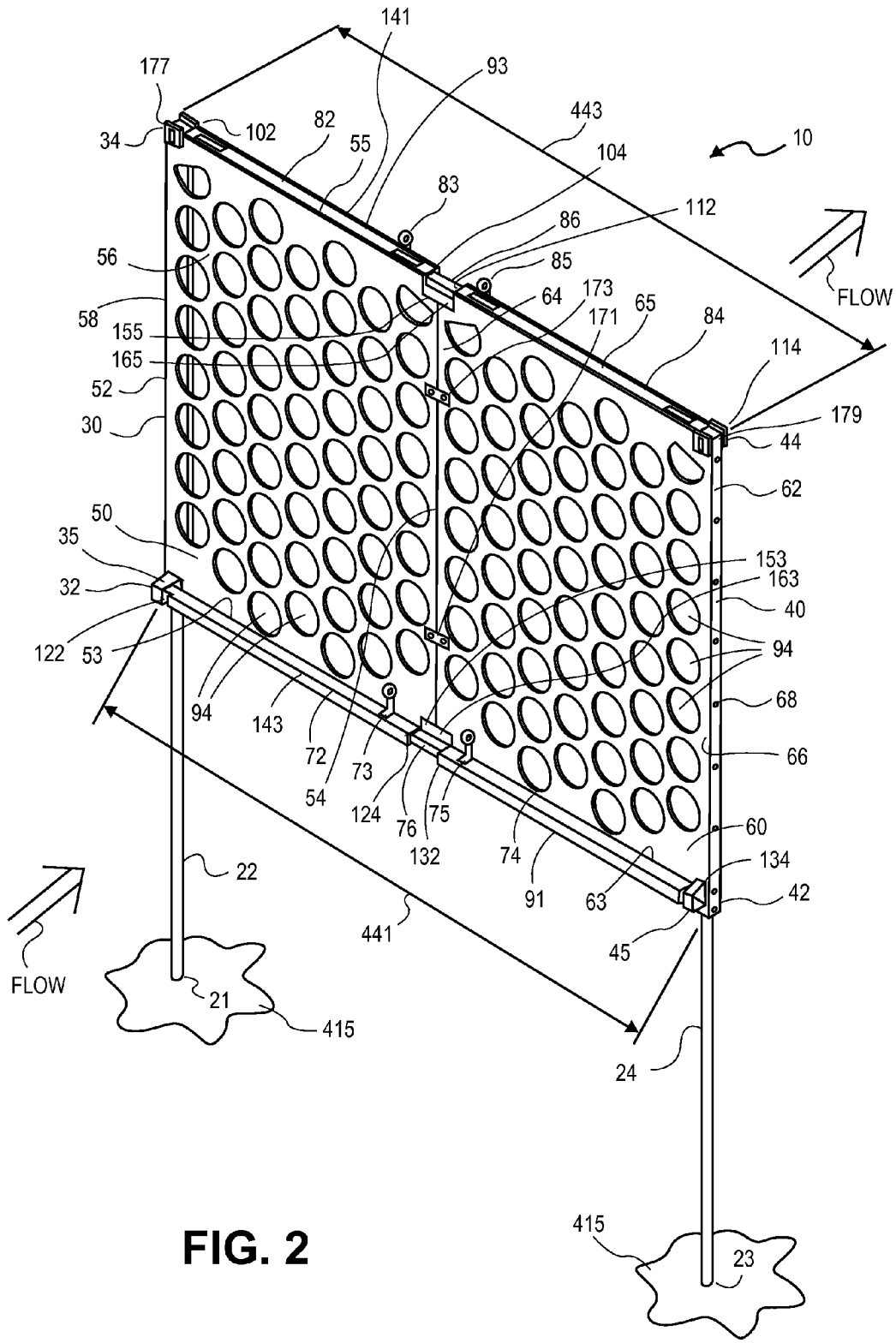
FIG. 2 illustrates by perspective view portions of the exemplary flow baffle apparatus of FIG. 1A.

Flow baffle apparatus 10 includes baffles 50, 60 mounted to adjustable cross-members 91, 93 (see FIG. 2). Adjustable cross-members 91, 93 are attached to side supports 30, 40 (see FIG. 2), and side supports 30, 40 are bolted to sidewall 410 of sump 405 generally opposite one another such that baffles 50, 55 are oriented generally perpendicular to the flow into sump 405 from pipe 432. Other implementations of the flow baffle apparatus may include more or fewer baffles, such as baffles 50, 55, or may include more or fewer adjustable cross-members, such as adjustable cross-members 91, 93. The flow baffle apparatus, such as flow baffle apparatus 10, may have other orientations with respect to the inflow pipe(s), such as pipe 433, and with respect to outflow pipe(s), such as pipe 434, in other implementations. Sidewall 410 of sump 405 is generally circular in this implementation, but other implementations may have multiple sidewalls or the sidewall(s) may have various shapes such as elliptical, polygonal, or so forth.

As illustrated in FIG. 1A, adjustable cross-member 93 includes cross-member 82, cross-member connector 86, and cross-member 84 (see FIGS. 2, 3A) with cross-members 82, 84 slideably received upon cross-member connector 86. Adjustable cross-member 91 includes cross-member 72, cross-member connector 76, and cross-member 74 with cross-members 72, 74 slideably received upon cross-member connector 76, as illustrated in FIGS. 2, 3B.

Figure 1B:
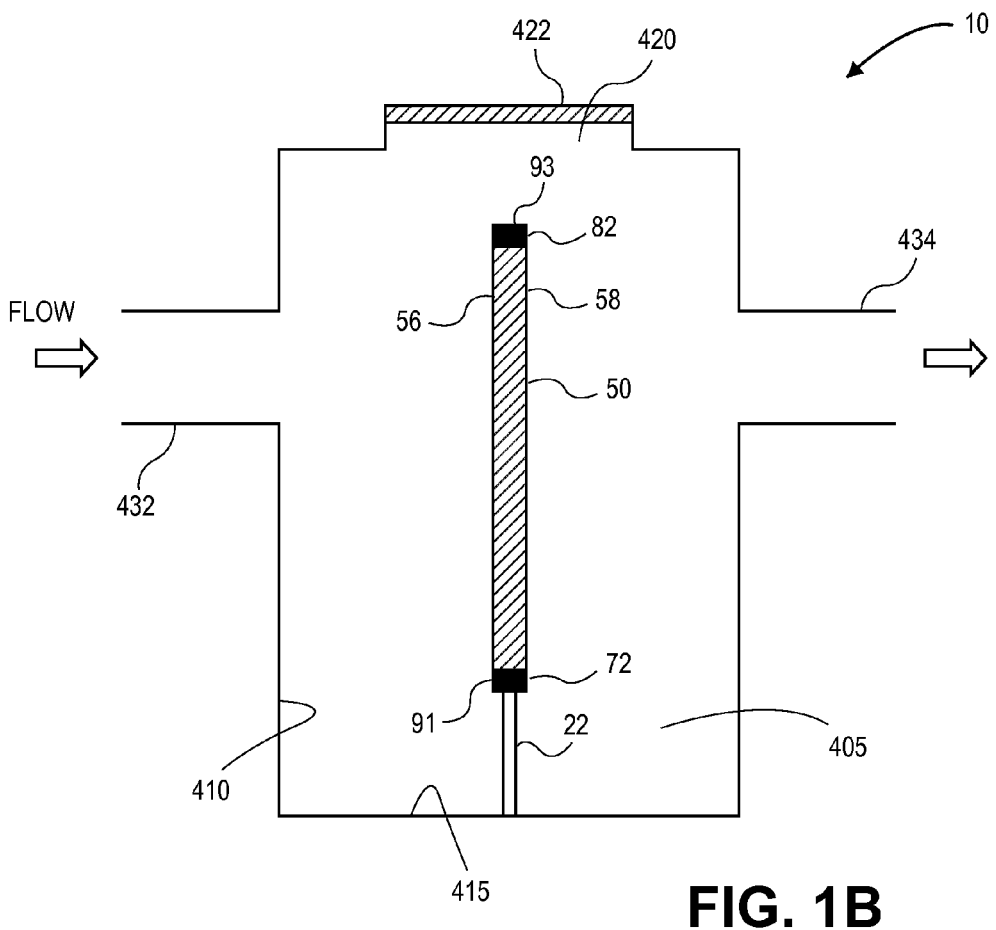
FIG. 1B illustrates by elevation view portions of the exemplary implementation of the flow baffle apparatus of FIG. 1A.

FIG. 1B illustrates flow baffle apparatus 10 positioned in sump 405 by cut-away elevation view. As illustrated, sump 405 may be accessed through manhole 420, which is covered by manhole cover 422. The portions of flow baffle apparatus 10 may be passed into sump 405 through manhole 420 for installation within sump 405. In various implementations, the portions of the flow baffle apparatus 10 are designed to pass through the manhole 420, where the manhole 420 may have an inside diameter of 24 inches. In some implementations, the inside diameter of the manhole 420 may be 21 inches or less and the portions of the flow baffle apparatus 10 may be designed to pass therethrough. The sump 405 in which the flow baffle apparatus 10 is installed may range from about 4 ft. in diameter to about 8 ft. in diameter or other characteristic dimension, in various implementations. Portions of the flow baffle apparatus 10 may be disassembled when passed through the manhole 420 and then assembled in the sump 405 as part of the installation process. These disassembled components may be sized to pass through the manhole 420. The components of the flow baffle apparatus 10 may be designed to fit the sump 405 when assembled.

In the view illustrated in FIG. 1B, baffle 50 is mounted to cross-member 82 of adjustable cross-member 93 and to cross-member 72 of adjustable cross-member 91. Cross-members 72, 82 are attached to side support 30 (see FIGS. 1A, 2, 4, 5A). Leveling support 22 joins side support 30 in this implementation. Leveling support 22 may be utilized to position side support 30 relative to sump bottom 415 prior to bolting of side support 30 onto sidewall 410 of sump 405. Bolting, bolt, and bolted, as used herein, encompasses securing or securement using concrete anchors, anchor bolts, or other such methods or mechanisms of attachment to concrete, masonry, and suchlike. Bolting, bolt, and bolted, as used herein, encompasses bolted attachment to steel plate that may form portions of side 410 of sump 405, welded attachment to such steel plate, cemented anchors, and other such methods or mechanisms of attachment and combinations of methods or mechanisms of attachment. Bolting, bolt, and bolted, as used herein, excludes interference fit. Side supports 30, 40 may include bolt holes or other features that facilitate bolting of the side supports 30, 40 to sidewall 410 of sump 405.

FIG. 2 illustrates portions of flow baffle apparatus 10 includes baffles 50, 60, adjustable cross-members 91, 93, cross-members 72, 74, 82, 84, cross-member connectors 76, 86, side supports 30, 40, and leveling supports 22, 24. The various components of flow baffle apparatus 10 including baffles 50, 60, adjustable cross-members 91, 93, cross-members 72, 74, 82, 84, cross-member connectors 76, 86, side supports 30, 40, and leveling supports 22, 24 may be formed, for example, of metals such as steel, cast iron, stainless steel, brass, copper, and aluminum, plastics such as polyvinyl chloride (PVC), wood, combinations thereof, and so forth, as would be readily recognized by those of ordinary skill in the art upon study of the present disclosure. Component(s) may be, for example, galvanized, coated with various plastics that inhibit corrosion, inhibit the growth of algae or other aquatic organisms on the component(s), coated with various materials that inhibit abrasion, and so forth, as would be readily recognized by those of ordinary skill in the art upon study of the present disclosure. The shapes of the various members such as round, rectangular, and so forth are exemplary and not limiting. Alternative shapes may be used in various other implementations.

As illustrated in FIG. 2, leveling supports 22, 24 are attached to side supports 30, 40, respectively. Leveling supports 22, 24, respectively, may be slideably engaged with side supports 30, 40 so that side supports 30, 40 may be positioned at a desired position with respect to leveling supports 22, 24, and locking mechanisms, such as bolt 151 (see FIG. 6), may be provided to secure side supports 30, 40 to leveling supports 22, 24 at the desired position. Ends 21, 23 of leveling supports 22, 24, respectively may be rested upon the sump bottom 415 of sump 405 while side supports 30, 40 are positioned about sidewall 410.

Side supports 30, 40 may be bolted to sidewall 410 of sump 405. Leveling supports 22, 24 may be used to support side supports 30, 40 respectively, in position prior to or while bolting side supports 30, 40 to sidewall 410. Side supports 30, 40 may be secured to sidewall 410 such that ends 34, 44 are generally horizontally aligned with one another (i.e. at the same elevation with respect to a benchmark) using the leveling supports 22, 24, respectively. Side support 30 may be positioned upon sidewall 410 such that end 32 and end 34 of side support 30 are generally vertically aligned with one another so that side support 30 runs vertically upon sidewall 410, in some implementations or may be set at an angle with respect to the vertical in other implementations. Side support 40 may be positioned upon sidewall 410 such that end 42 and end 44 of side support 40 are generally vertically aligned with one another so that side support 40 runs vertically upon sidewall 410.

As illustrated in FIG. 2, adjustable cross-member 93 includes cross-member 82, cross-member connector 86, and cross-member 84 with cross-members 82, 84 slideably received upon cross-member connector 86. Cross-members 82, 84 are secured to one another by cross-member connector 86 that extends at least between ends 104, 112 of cross-members 82, 84. Cross-members 82, 84 may be slideably mounted upon cross-member connector 86 so that the length 443 of adjustable cross-member 93, which includes cross-members 82, 84 and cross-member connector 86, may be adjusted by sliding cross-members 82, 84 upon cross-member connector 86 until length 443 of adjustable cross-member 93 is set to span between side support 30 and side support 40 at the points of attachment of adjustable cross-member 93. Locks 83, 85 are positioned generally proximate ends 104, 112 of cross-members 82, 84 respectively, as illustrated. Locks 83, 85 may secure cross-members 82, 84 upon cross-member connector 86 with the adjustable cross-member 93 positioned at length 443 to hold the adjustable cross-member 93 at length 443. Locks 83, 85 may be eye bolts, set screws, bolts, winged bolts and so forth that frictionally engage the cross-members 82, 84 to cross-member connector 86 at the desired length 443. Various numbers of locks, such as locks 83, 85, may be provided in various implementations and the locks may be variously positioned along cross-members 82, 84.

Ends 102, 114 of cross-members 82, 84 are secured to ends 34, 44 of side supports 30, 40, respectively, and adjustable cross-member 93 spans portions of sump 405 between end 34 of side support 30 and end 44 of side support 40, as illustrated. Ends 102, 114 of cross-members 82, 84 may be secured to end caps 177, 179 (see FIG. 4) that are slidably received over ends 34, 44 of side supports 30, 40, respectively. Ends 102, 114 of cross-members 82, 84 may be secured to end caps 177, 179, respectively using bolts, pinned connectors, welds, and so forth, in various implementation. In various other implementations (not shown), ends 102, 114 of cross-members 82, 84 may be secured directly to ends 34, 44 of side supports 30, 40, respectively using bolts, pinned connectors, welds, and so forth, in various implementation. With locks 83, 85 engaged to secure cross-members 82, 84 upon cross-member connector 86, the adjustable cross-member 93 forms a rigid support spanning between side supports 30, 40 to support baffles 50, 60 thereupon. Side supports 30, 40 may be secured to sidewall 410 such that ends 34, 44 are generally horizontally aligned with one another so that the adjustable cross-member 93 extends generally horizontally between side support 30 and side support 40.

Adjustable cross-member 91, as illustrated in FIG. 2, includes cross-member 72, cross-member connector 76, and cross-member 74 with cross-members 72, 74 slideably received upon cross-member connector 76. Cross-members 72, 74 are secured to one another by cross-member connector 76 that extends at least between ends 124, 132 of cross-members 72, 74. Cross-members 72, 74 may be slideably mounted upon cross-member connector 76 so that the length 441 of adjustable cross-member 91, which includes cross-members 72, 74 and cross-member connector 76, may be adjusted by sliding cross-members 72, 74 upon cross-member connector 76 until length 441 of adjustable cross-member 91 is set to span between side support 30 and side support 40 at the points of attachment of adjustable cross-member 91 to side supports 30, 40. Locks 73, 75 are positioned generally proximate ends 124, 132 of cross-members 72, 74 respectively. Locks 73, 75 may secure cross-members 72, 74 upon cross-member connector 76 with the adjustable cross-member 91 positioned at length 441 to hold the adjustable cross-member 91 at length 441. Locks 73, 75 may be eye bolts, set screws, bolts, winged bolts and so forth that frictionally engage the cross-members 72, 74 to cross-member connector 76 at the desired length 441. Various numbers of locks, such as locks 73, 75, may be provided in various implementations and the locks may be located at various positions along cross-members 72, 74.

Ends 122, 134 of cross-members 72, 74 are secured to ends 32, 42 of side supports 30, 40, respectively, and adjustable cross-member 91 extends between end 32 of side support 30 and end 42 of side support 40 to span portions of the sump 405 between side support 30 and side support 40, as illustrated. Ends 122, 134 of cross-members 72, 74 may be secured to ends 32, 42 of side supports 30, 40, respectively, by being received in detents such as detents 35, 45 (see FIGS. 5A, 5B) or by bolts, pinned connectors, welds, combinations thereof, and so forth, in various implementation. With locks 73, 75 engaged to secure cross-members 72, 74 upon cross-member connector 76, the adjustable cross-member 91 forms a rigid support between side supports 30, 40 to support baffles 50, 60 thereupon. Side supports 30, 40 may be secured to sidewall 410 such that ends 32, 42 are generally horizontally aligned with one another so that the adjustable cross-member 91 extends generally horizontally between side support 30 and side support 40.

Length 441 may differ from length 443 due to imperfections of construction, and length 441 may differ from length 443 in different sumps constructed to the same general standard. The length 441 of the adjustable cross-member 91 or the length 443 of adjustable cross-member 93 may be adjusted to span between side support 30 and side support 40 at the points of attachment of adjustable cross-members 91, 93 in order to accommodate such variations.

As illustrated in FIG. 2, baffle 50 is formed as a perforated flat sheet of material and is oriented such that surface 56 of baffle 50 is oriented generally upstream and surface 58 of baffle 50 is oriented generally downstream. Surfaces 56, 58 of baffle 50 are generally planar. Baffle 50 is secured to cross-member 82 generally along side 55 and baffle 50 is secured to cross-member 72 generally along side 53, as illustrated in FIG. 2.

Figure 7A:
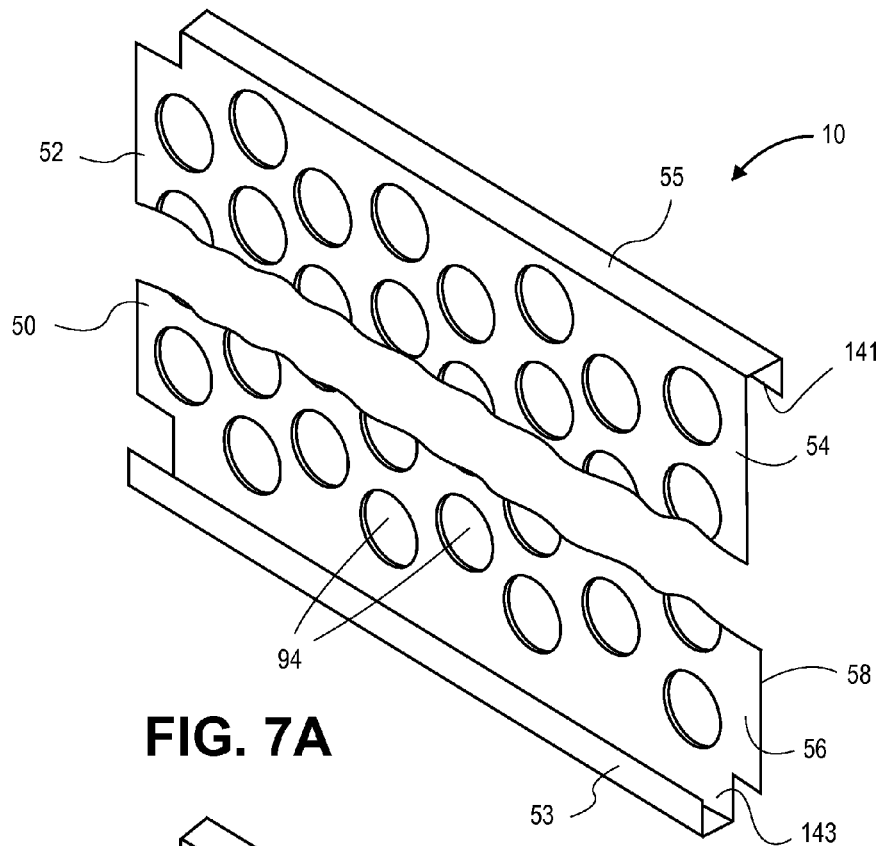
FIG. 7A illustrates by elevation perspective view portions of the exemplary flow baffle apparatus of FIG. 1A.

Baffle 50, in this implementation, includes channel 141 along side 55 and an opposing channel 143 along side 53 (see FIG. 7A). Channel 141 is engaged with cross-member 82 thereby securing side 55 of baffle 50 to cross-member 82, and the opposing channel 143 is secured to cross-member 72 thereby securing side 53 of baffle 50 to cross-member 72. Side 52 of baffle 50 may be secured to side support 30 by screws, bolts, welds, etc. Surface 58 of baffle 50 is upstream of side support 30 and surface 58 may be generally biased against side support 30 by the force of the water striking surface 56 of baffle 50, as illustrated.

As cross-member 82, which forms a portion of adjustable cross-member 93, may be set generally horizontal, side 55 of baffle 50, which is engaged with cross-member 82 may be generally horizontal. Water may flow over side 55 of baffle 50 as a weir. As cross-member 72 may be set generally horizontal, side 53 of baffle 50, which is engaged with cross-member 72, may also be generally horizontal. Water may flow between side 53 of baffle 50 and sump bottom 415 and the baffle 60 and cross-member 72 may be positioned to provide a gap between side 63 and sump bottom 410 for the passage of flow therethrough. Holes 94 that pass through baffle 50 between surface 56 and surface 58 are disposed about baffle 50, and water may flow through holes 94 of baffle 50. The holes 94 may be generally similar in size, as illustrated, or may vary in size in other implementations. Holes, such as holes 94, may be placed about the baffle(s), such as baffles 50, 60, such that the baffle(s) may have a percent of open area ranging from about 40% to about 50%, and the diameter of holes 94 may range from about 2 inches to about 6 inches.

As illustrated in FIG. 2, baffle 60 is oriented such that surface 66 of baffle 60 faces upstream and surface 68 of baffle 60 faces downstream. Baffle 60 is secured to cross-member 84 generally along side 65 and baffle 60 is secured to cross-member 74 of adjustable cross-member 91 generally along side 63, as illustrated in FIG. 2. Baffle 60, in this implementation, includes a channel 161 along side 65 and an opposing channel 163 along side 63 (see FIG. 7B). Channel 161 is engaged with cross-member 84 of adjustable cross-member 93 thereby securing side 65 of baffle 60 to cross-member 84, and the opposing channel 163 is secured to cross-member 74 thereby securing side 63 of baffle 60 to cross-member 74. Portions of baffle 60 generally along side 62 may be secured to side support 40 by screws, bolts, welds, etc. Surface 68 of baffle 60 is upstream of side support 40 and may be generally biased against side support 40 by the force of the water striking surface 66 of baffle 60, as illustrated.

As cross-member 84, which forms a portion of adjustable cross-member 93, may be set generally horizontal, side 65 of baffle 60, which is engaged with adjustable cross-member 84 may be generally horizontal. Water may flow over side 65 of baffle 60 as a weir. As adjustable cross-member 74 may be set generally horizontal, side 63 of baffle 60, which is engaged with adjustable cross-member 74, may be generally horizontal. Water may flow between side 63 of baffle 60 and sump bottom 415 and the baffle 60 may be positioned to provide a gap between side 63 and sump bottom 415 for the passage of flow therethrough. Holes 94 that pass through baffle 60 between surface 66 and surface 68 are disposed about baffle 60, and water may flow through holes 94 of baffle 60.

Side 54 of baffle 50 faces side 64 of screen 60, as illustrated in FIG. 2. Side 54 of screen 50 may be generally aligned with side 64 of screen 60 and sides 54 and 64 may be generally vertical, in implementations in which length 441 is substantially equal to length 443. In implementations in which length 441 differs from length 443, side 54 of screen 50 may be overlapped with side 64 of screen 60 to compensate for differences between length 441 and length 443. Notches 153, 155 are provided along side 54 of baffle 50, and notches 163, 165 are provided along side 64 of baffle 60, as illustrated in FIG. 2, to allow screen 50 to overlap with screen 60, to allow for adjustment of the length 441 of adjustable cross-member 91, or to allow for adjustment of the length 443 of adjustable cross-member 93. Connectors 171, 173 may be disposed proximate sides 54, 64, as illustrated in FIG. 2, to secure sides 54, 64 to one another.

In implementations wherein side supports 30, 40 are oriented vertically, baffles 50, 60 are oriented such that perpendiculars to surfaces 56, 58 of baffle 50 and perpendiculars to surfaces 66, 68 of baffle 60 point in the horizontal direction. In implementations wherein side supports 30, 40 are oriented at an angle to the vertical, baffles 50, 60 are oriented such that perpendiculars to surfaces 56, 58 of baffle 50 and perpendiculars to surfaces 66, 68 of baffle 60 point in a direction perpendicular to the angle to the vertical of side supports 30, 40.

Figure 3A:
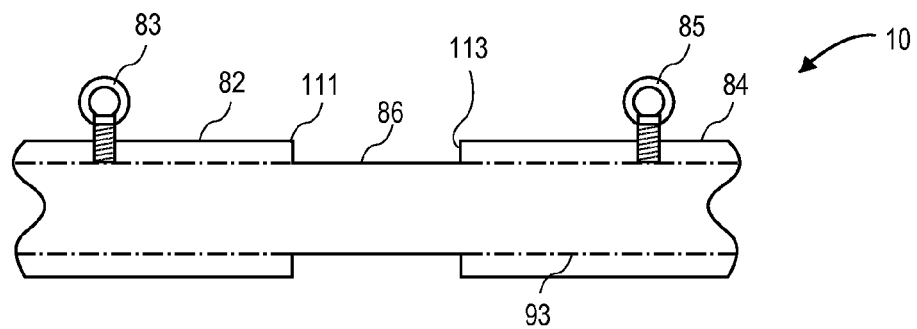
FIG. 3A illustrates by elevation view portions of the exemplary flow baffle apparatus of FIG. 1A.
Figure 3B:
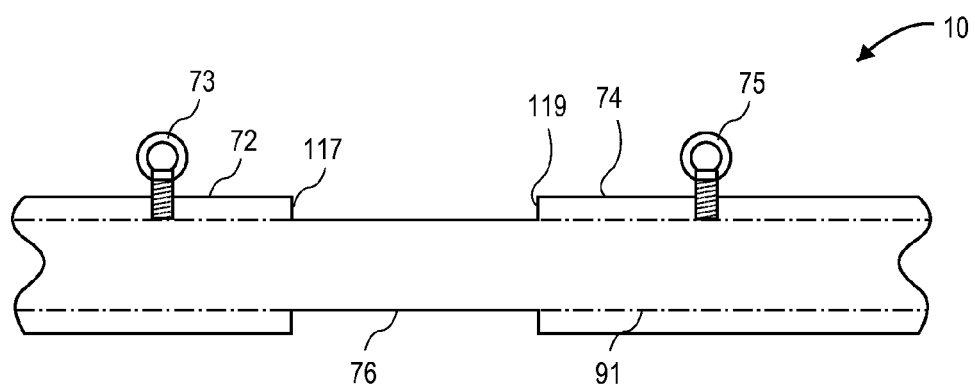
FIG. 3B illustrates by elevation view portions of the exemplary flow baffle apparatus of FIG. 1A.

FIG. 3A illustrates an implementation of adjustable cross-member 93 that includes cross-member 82 and cross-member 84 slideably receives cross-member connector 86. As illustrated, cross-member 82 receives portions of cross-member connector 86 internally so that cross-member 82 slides over cross-member connector 86 to adjust the length 443 of adjustable cross-member 93. Cross-member 82 and cross-member connector 86 may be locked into position with respect to one another using lock 83 to hold adjustable cross-member 93 at the desired length. Lock 83 is formed as a eye bolt threadedly engaged with cross-member 82 that may be turned until frictionally engaged with cross-member connector 86 to lock the cross-member connector 86 and cross-member 82 to one another, in this implementation. Lock 83 may be a bolt, screw, or other mechanism suitable to releasably engage cross-member 82 and cross-member connector 86 to one another in various implementations.

Cross-member 84 is slideably received on cross-member connector 86, as illustrated in FIG. 3A. Cross-member 84 receives portions of cross-member connector 86 internally, so that cross-member 84 slides over cross-member connector 86, in this implementation, to adjust the length 443 of adjustable cross-member 93. Cross-member 84 and cross-member connector 86 may be locked into position with respect to one another using lock 85 to hold adjustable cross-member 93 at the desired length. Lock 85 is formed as an eye bolt threadedly engaged with cross-member 84 that may be turned until frictionally engaged with cross-member connector 86 to lock the cross-member connector 86 and cross-member 84 to one another, in this implementation. Lock 85 may be a bolt, screw, or other mechanism suitable to releasably engage cross-member 84 and cross-member connector 86 to one another in various implementations.

FIG. 3B illustrates cross-member 72 and cross-member 74 slideably received on cross-member connector 76 to form adjustable cross-member 91. As illustrated, portions of cross-member connector 76 are received internally by cross-member 72, so that cross-member 72 slides over cross-member connector 76 to adjust the length 441 of adjustable cross-member 91. Cross-member 72 and cross-member connector 76 may be locked into position with respect to one another using lock 73 to hold adjustable cross-member 91 at the desired length. Lock 73 is formed as an eye bolt hreadedly engaged with cross-member 72 that may be turned until frictionally engaged with cross-member connector 76 to lock the cross-member connector 76 and cross-member 72 to one another, in this implementation. Lock 73 may be a bolt, screw, or other mechanism suitable to releasably engage cross-member 72 and cross-member connector 76 to one another in various implementations.

Cross-member 74 is slideably received on cross-member connector 76, as illustrated in FIG. 3B. Portions of cross-member connector 76 are received internally by cross-member 74, so that cross-member 74 slides over cross-member connector 76 to adjust the length 441 of adjustable cross-member 91, in this implementation. Cross-member 74 and cross-member connector 76 may be locked into position with respect to one another to hold adjustable cross-member 91 at the desired length using lock 75. Lock 75 is formed as an eye bolt threadedly engaged with cross-member 74 that may be turned until frictionally engaged with cross-member connector 76 to lock the cross-member connector 76 and cross-member 74 to one another, in this implementation. Lock 75 may be a bolt, screw, or other mechanism suitable to releasably engage cross-member 74 and cross-member connector 76 to one another in various implementations.

Figure 4:
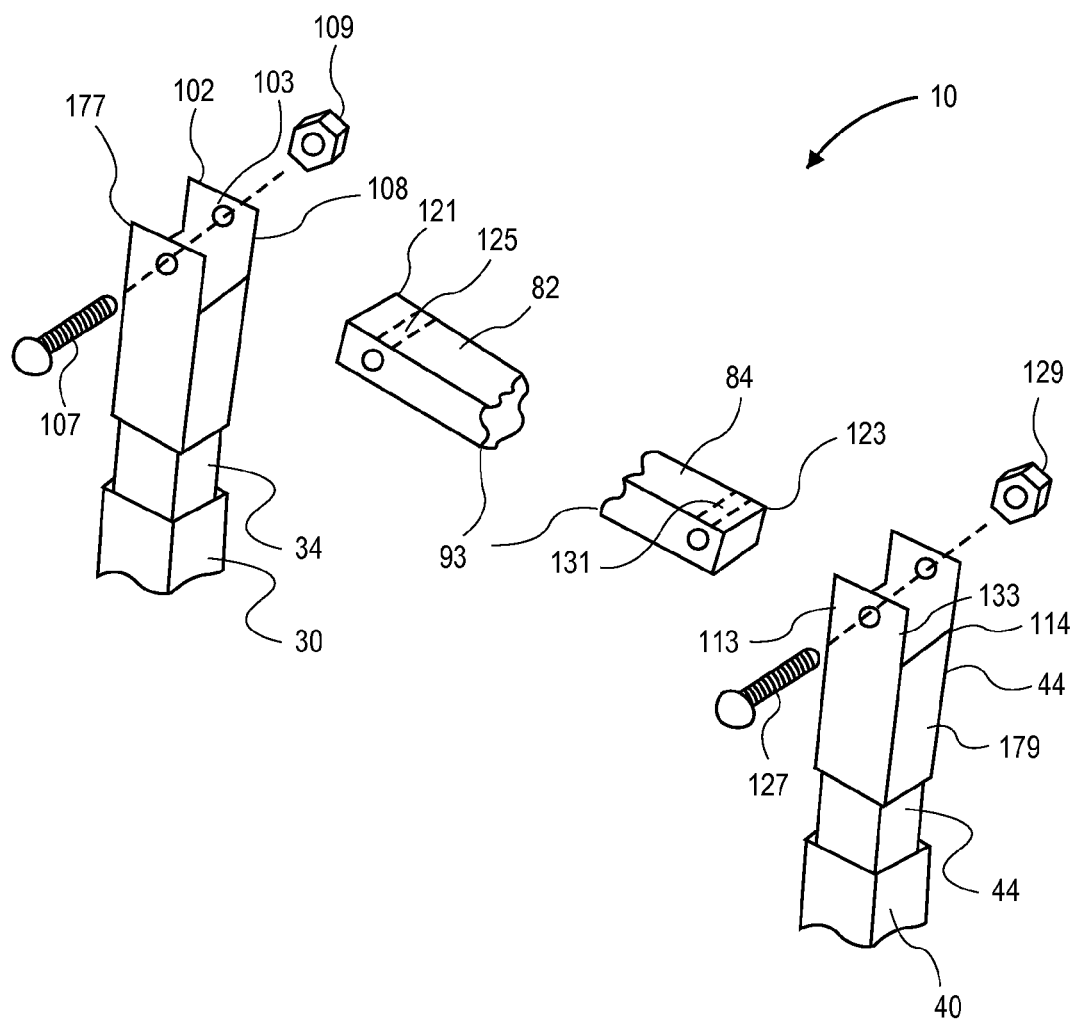
FIG. 4 illustrates by elevation perspective view portions of the exemplary flow baffle apparatus of FIG. 1A.

FIG. 4 illustrates the engagement of adjustable cross-member 93 with side supports 30, 40. As illustrated in FIG. 4, end 121 of cross-member 82 of adjustable cross-member 93 includes hole 125 that may be aligned with holes 103 of flange 108 of end cap 177. End cap 177 is adapted to be slidably received over portions of side support 30 generally proximate end 34, and end cap 177 may be held in place upon end 34 by a combination of friction and gravity. Bolt 107 may be passed through holes 103, 125 to secure end 121 of cross-member 82 to end cap 177. Nut 109 may be threadedly affixed to bolt 107 to hold bolt 107 in place within holes 103, 125.

As illustrated in FIG. 4, end 123 of cross-member 84 of adjustable cross-member 93 includes hole 131 that may be aligned with holes 133 of flange 113 of end cap 179. End cap 179 is adapted to be slidably received over portions of side support 40 generally proximate end 44 end cap 179 may be held in place upon end 44 by a combination of friction and gravity. Bolt 127 may be passed through holes 131, 133 to secure end 123 of cross-member 84 to end cap 179. Nut 129 may be threadedly affixed to bolt 127 to hold bolt 127 in place within holes 131, 133. Various pins, screws, welds, and other fasteners may be substituted for bolts 107, 127 and nuts 109, 129 in other implementations.

Use of end caps 177, 179 to secure adjustable cross-member 93 to side supports 30, 40 allows for the assembly of adjustable cross-member 93 in attachment to end caps 177, 179. The assembly of adjustable cross-member 93 with end caps 177, 179 attached thereto may be manipulated by attaching a cable to lock 83, 85 which are configured as eye bolts in this implementation. For example, end caps 177, 179 could be attached to adjustable cross-member 93 above ground and the assembly of adjustable cross-member 93 with end caps 177, 179 attached thereto may be lowered into the sump and onto ends 34, 44 using a cable attached to locks 83, 85. As an additional example, the assembly of adjustable cross-member 93 with end caps 177, 179 attached thereto may be pulled off of ends 34, 44 and removed from the sump by a cable attached to locks 83, 85.

In other implementations, adjustable cross-member 93 may be secured to side supports 30, 40, for example, by bolts, screws, various other fasteners, welds, combinations thereof, and so forth, in other implementations. Although FIG. 4 illustrates adjustable cross-member 93 secured to side supports 30, 40 generally at ends 34, 44, adjustable cross-member 93 may be secured to side supports 30, 40 at other locations generally between ends 32, 34 and between ends 42, 44, respectively, in various other implementations.

FIG. 5A illustrates the engagement of adjustable cross-member 91 with side supports 30, 40. As illustrated in FIG. 5A, detents 35, 45 are located proximate ends 32, 42 of sides supports 30, 40, respectively. End 122 of cross-member 72 of adjustable cross-member 91 is received within receptacle 137 of detent 35, and end 134 of cross-member 74 is received within receptacle 139 of detent 45. With at least some of cross-members 72, 74 and cross-member connector 76 slideably engaged with one another, ends 122, 134 may be placed in receptacles 137, 139 and then cross-members 72, 74 and cross-member connector 76 locked into fixed engagement with one another to hold ends 122, 134 within receptacles 137, 139. Adjustable cross-member 91 may be manipulated by attaching a cable to locks 73, 75 that are configured as eye bolts in this implementation.

As illustrated in FIG. 5A, detents 35, 45 are positioned proximate ends 32, 42 of side supports 30, 40. Detents 35, 45 may be positioned at other locations along side supports 30, 40 in other implementations, and detents 35, 45 may or may not be symmetrically positioned along side supports 30, 40 with respect to one another. Adjustable cross-member 91 may be secured to side supports 30, 40, in other ways, for example, by bolts, screws, various other fasteners, welds, combinations thereof, and so forth, in other implementations.

A detail of detent 35 with end 122 of cross-member 72 received therein is illustrated in FIG. 5B. As illustrated, detent 35 is secured to side support 30 generally proximate end 32. Detent 35 may be welded to side support 30, bolted to side support 30, or secured to side support 30 in various other ways. Detent 35 includes receptacle 137, which is formed as rectangular cavity within detent 35. End 122 of cross-member 72 is rectangular in shape to conform to the rectangular cavity form of receptacle 137 in order to be received within receptacle 137, as illustrated. The rectangular shape of cross-member 72 and receptacle 137 may prevent rotation of cross-member 72 when cross-member 72 is received within receptacle 137. In this implementation, detent 45 with end 134 of cross-member 74 received therein is similar to detent 35 with end 122 of cross-member 72 received therein as illustrated in FIG. 5B.

FIG. 6 illustrates portions of side support 30 proximate end 22 engaged with leveling support 22. As illustrated in FIG. 6, leveling support 22 is slideably received within side support 30. Bolt 151 is threadedly engaged with side support 30 such that, when tightened, bolt 151 frictionally engages leveling support 22 to hold the side support 30 fixedly to leveling support 22. Thus, the leveling support 22 and side support 30 may be slideably positioned with respect to one another and then locked into position by tightening bolt 151. Side support 40 may slideably receive leveling support 24 and side support 40 may be fixed to leveling support 24 in a manner similar to that of leveling support 22 and side support 30 illustrated in FIG. 6. In implementations such as that illustrated in FIG. 6, ends 21, 23 of side supports 22, 24, respectively, may be placed upon sump bottom 415 of sump 405 and sides supports 30, 40 may be slid upon leveling supports 22, 24, respectively, until ends 34, 44, of side supports 30, 40 are positioned at the desired elevation, respectively, about side 410. With side supports 30, 40 so positioned, the side supports may then be attached to the wall 410 of the sump 405.

FIG. 7A illustrates portions of baffle 50 including channel 141 and channel 143. As illustrated, channel 141 is formed along side 55 of baffle 50 and channel 143 is formed along side 53, which is opposite side 55, of baffle 50. As illustrated, channel 143 is formed generally along surface 56 of baffle 50 and channel 141 is formed generally along surface 58 of baffle 50 so that channel 141 and channel 143 extend forth perpendicularly in opposite directions from opposing surfaces of baffle 50. Channel 141 and channel 143 may be generally rectangular in shape. Channel 141 may be engaged with cross-member 82 of adjustable cross-member 93 and channel 143 may be engaged with cross-member 72 of adjustable cross-member 91 to secure the baffle 50 to adjustable cross-members 93, 91, respectively. Cross-member 82 may be generally rectangular in shape in correspondence to the shape of channel 141 in order to be received within channel 141. Cross-member 72 may be generally rectangular in shape in correspondence to the shape of channel 143 in order to be received within channel 143.

Figure 7B:
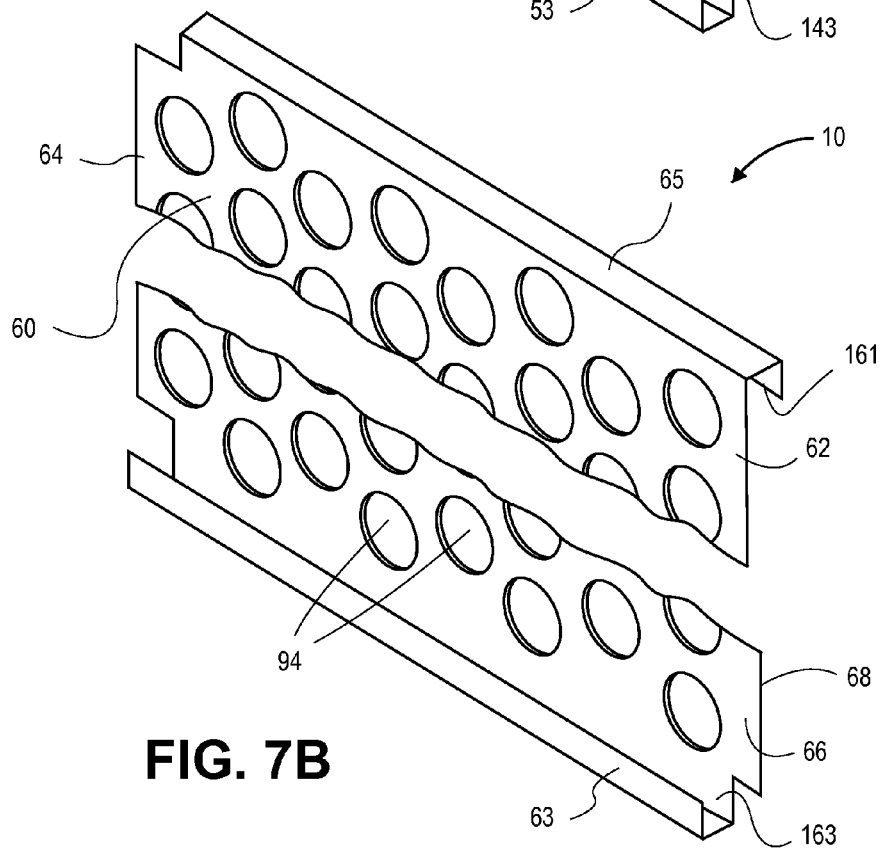
FIG. 7B illustrates by elevation perspective view portions of the exemplary flow baffle apparatus of FIG. 1A.

FIG. 7B illustrates portions of baffle 60 including channel 161 and channel 163. As illustrated, channel 161 is formed along side 65 of baffle 60 and channel 163 is formed along side 63, which is opposite side 65, of baffle 60. As illustrated, channel 163 is formed generally along surface 66 of baffle 60 and channel 161 is formed generally along surface 68 of baffle 60 so that channel 161 and channel 163 extend forth perpendicularly in opposite directions from opposing surfaces of baffle 60. Channel 161 and channel 163 may be generally rectangular in shape. Channel 161 may be engaged with cross-member 84 of adjustable cross-member 93 and channel 163 may be engaged with cross-member 74 of adjustable cross-member 91 to secure the baffle 60 to adjustable cross-members 93, 91, respectively. Cross-member 84 may be generally rectangular in shape in correspondence to the shape of channel 161 in order to be received within channel 161. Cross-member 74 may be generally rectangular in shape in correspondence to the shape of channel 163 in order to be received within channel 163.

In assembly, the components, including, for example, baffles, such as baffles 50, 60, adjustable cross-members, such as adjustable cross-members 91, 93, side supports, such as side supports 30, 40, and leveling supports, such as leveling supports 22, 24, may be ported into a sump, such as sump 405, through a manhole, such as manhole 420. The components may be in various states of disassembly to accommodate passage through the manhole, which includes other access passages, into the sump. For example, adjustable cross-members may be separated into subcomponents. For example, adjustable cross-members 91, 93 may be disassembled into subcomponents that include cross-members 72, 74, 82, 84 and cross-member connectors 76, 86, and the subcomponents may be passed through the manhole. The components, the subcomponents, or combinations thereof, may be sized to pass through the manhole into the sump and may be sized for assembly in the sump and may be sized for installation within a sump having a particular diameter or other characteristic dimension. Lightweight materials may be selected to form the components or the subcomponents, for example, in order to facilitate passage through the manhole into the sump.

Side supports may be slideably received upon the leveling supports with one side support received upon a corresponding leveling support. For example, side support 30 may be received upon corresponding leveling support 22 and side support 40 may be received upon corresponding leveling support 24. The ends, such as ends 21, 23, of the leveling supports may be placed upon the sump bottom, such as sump bottom 415, and the corresponding side supports then positioned about the sidewall, such as sidewall 410. With ends of the leveling supports resting upon the sump bottom, the side supports may be slidably positioned upon the leveling supports until the side supports are positioned at the desired elevation. The side supports may be positioned in a generally vertical orientation. With the side supports positioned upon the leveling supports such that ends, such as ends 34, 44, are positioned at a desired elevation(s) with respect to a benchmark, the side supports may be locked to the corresponding leveling supports such that the leveling supports, which rest upon the sump bottom, support the corresponding side supports in the desired position. The side supports may be locked to the leveling support using a locking mechanism, such as bolt 151. With the side supports supported in position by the leveling supports, the side supports may be bolted to the sidewall of the sump. The ends of the side supports may be generally in horizontal alignment with one another. For example, end 34 of side support 30 may be placed at essentially the same elevation as end 44 of side support 40 so that end 34 and end 44 are in horizontal alignment with one another. Similarly, for example, ends 32 42 may be placed at essentially the same elevation so that ends 32, 42 are in horizontal alignment with one another.

Adjustable cross-members, such as adjustable cross-members 91, 93, may be assembled from cross-members and cross-member connectors. For example, adjustable cross-member 91 may be assembled from cross-members 72, 74 and cross-member connector 76 by receiving cross-members 72, 74 upon cross-member connector 76. As a further example, adjustable cross-member 93 may be assembled from cross-members 82, 84 and cross-member connector 86 by receiving cross-members 82, 84 upon cross-member connector 86. The adjustable cross-members may be assembled above ground, within the sump, or both.

An end of the adjustable cross-member, such as end 121, 122, may be secured to the side support. An opposing end of the adjustable cross-member, such as ends 123, 134, may be secured to the opposing side support. The ends of the adjustable cross member may be secured to end caps such as end caps 177, 179 and the end caps may be placed over ends of the side supports to secure the adjustable cross member to the side supports. The adjustable cross-member may be secured directly to the side supports by, for example, a pinned connection, by being received within a detent, weld, or bolt or other fastener, or combinations thereof. The adjustable cross-member may be locked into the desired length, such as length 441, 443, prior to attachment to the side supports, locked at the desired length following attachment to the side supports, or locked at the desired length while being attached to the side supports, in various implementations. The adjustable cross-member may be locked at the desired length by locks, such as locks 73, 75, 83, 85, provided about the adjustable cross-member for that purpose. Lengths of the adjustable cross-members, such as lengths 441, 443, are adjustable to vary in order to compensate for variations in the distance between the side supports that may result, for example, from imperfections of construction of the sump.

The baffle(s), such as baffles 50, 60, may be secured to the adjustable cross-members. The baffle(s) may be secured to the adjustable cross-members by channels, such as channels 141, 143, 161, 163, that fit over portions of the adjustable cross-members such that portions of the adjustable cross-members are received within the channels to secure the baffle(s) to the adjustable cross-members. Additional or alternative mechanisms of attachment apart from the channels may be provided to secure the baffle(s) to the adjustable cross-members in various implementations. The baffle(s) may be secured to the adjustable cross-members at any convenient point in the assembly. The baffle(s) may be secured to the side support(s) by bolt, weld, various fasteners, and so forth. In implementations involving multiple baffles, the baffles may be secured to one another in various ways. Various implementations may employ one baffle, two baffles as generally illustrated herein, or three or more baffles.

Figure 8:
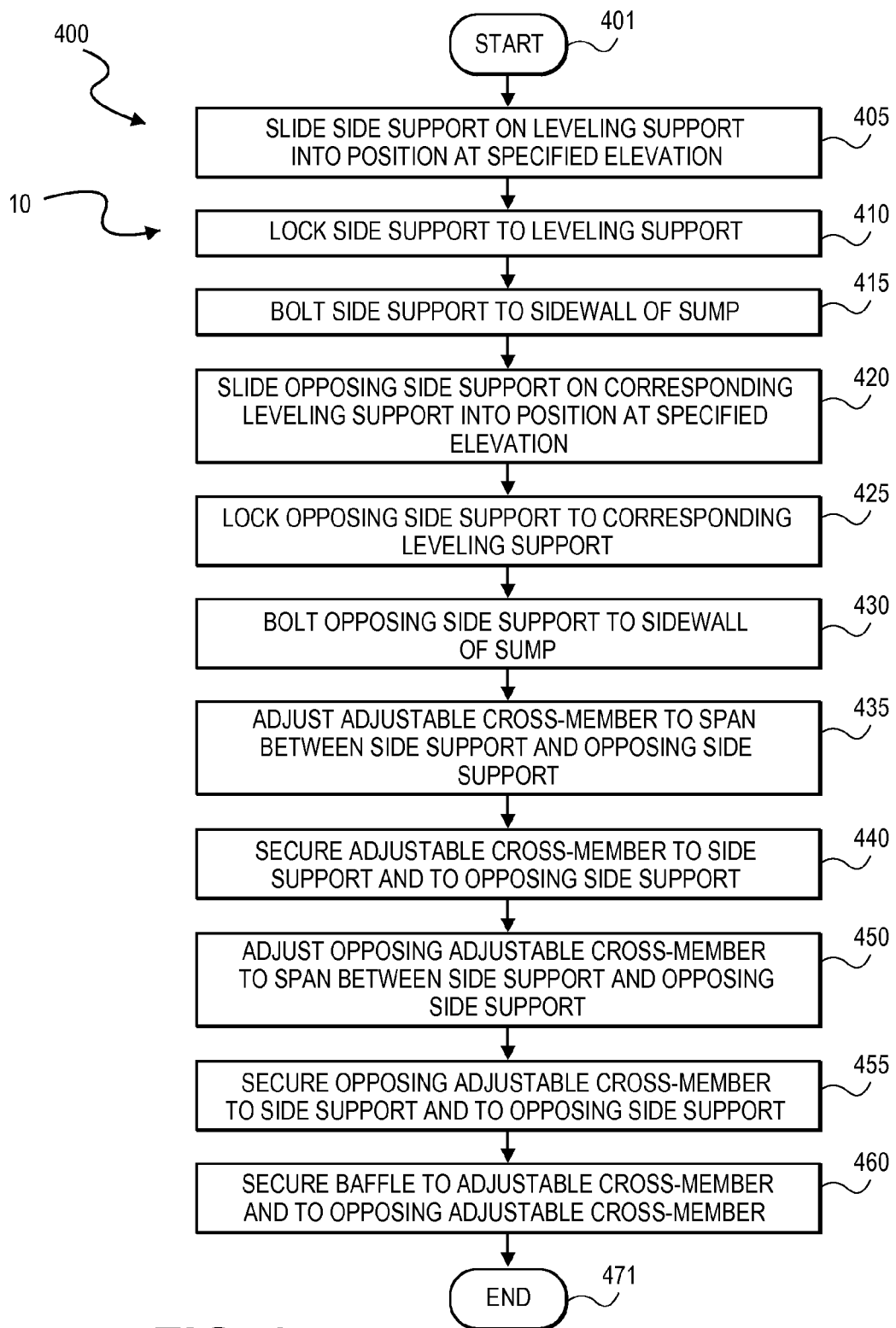
FIG. 8 illustrates by process flow chart an exemplary process of installation of the exemplary flow baffle apparatus of FIG. 1A.

FIG. 8 illustrates by process flow diagram an exemplary process of assembly 400. As illustrated in FIG. 8, process 400 is entered at step 401. At step 405, a side support, which is slideably received on a leveling support, is slid upon leveling support into position at the desired elevation within the sump.

At step 410, the side support is locked to the leveling support. At step 415, the side support is bolted to the sidewall of the sump. The side support may be supported by the leveling support to which the side support is locked generally during step 415. The leveling support may rest upon the sump bottom of the sump to hold the side support in position while the side support is bolted to the sidewall of the sump.

At step 420, an opposing side support, which is slideably received on a corresponding leveling support, is slid upon the corresponding leveling support into position at the desired elevation within the sump. The opposing side support is locked to the corresponding leveling support at step 425. The opposing side support is bolted to the sidewall of the sump at step 430. The opposing side support may be support by the corresponding leveling support to which the opposing side support is locked generally during step 430. The corresponding leveling support may rest upon the sump bottom of the sump to hold the opposing side support in position while the opposing side support is bolted to the sidewall of the sump. The leveling supports may be removed from the side support and from the opposing side support after the side support and the opposing side support have been bolted to the sidewall.

An adjustable cross-member is adjusted to span between the side support and the opposing side support, at step 435. The adjustable cross-member is then secured to the side support and secured to the opposing side support at step 440. The adjustable cross-member may be locked into the length require to span between the side support and the opposing side support during either step 435 or step 440, in various implementations.

At step 450, an opposing adjustable cross-member is adjusted to span between the side support and the opposing side support. The opposing adjustable cross-member is then secured to the side support and secured to the opposing side support at step 455. The adjustable cross-member may be locked into the length require to span between the side support and the opposing side support during either step 450 or step 455, in various implementations. At step 460, a baffle is secured to the adjustable cross-member and secured to the opposing adjustable cross-member. The length of the adjustable cross-member and the opposing adjustable cross-member may vary from one another to account for variations in the distance between the side supports at the points where the adjustable cross-member and the opposing adjustable cross-member are connected to the side supports.

The foregoing discussion along with the Figures discloses and describes various exemplary implementations. These implementations are not meant to limit the scope of coverage, but, instead, to assist in understanding the context of the language used in this specification and in the claims. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A flow baffle installation kit, comprising:
   a side support adapted to attach to a sidewall of a sump;
   a leveling support adapted to be slideably adjustably received by the side support to allow the side support to be selectively positioned relative to a sump bottom of the sump for attachment of the side support to the sidewall;
   an opposing side support adapted to attach to the sidewall of the sump;
   a corresponding leveling support adapted to be slideably received by the opposing side support to allow the opposing side support to be selectively positioned relative to the sump bottom for attachment of the opposing side support to the sidewall;
   an adjustable cross-member configured to attach to side support and attach to the opposing side support; and
   a planar baffle adapted to attach to the adjustable cross-member with a gap between a bottom of the baffle and the sump bottom, the gap being selectable by the selective positioning of the side support.

2. The kit, as in claim 1, further comprising:
   a second adjustable cross-member adapted to attach to the side support, to the opposing side support, and to the baffle.

3. The kit, as in claim 2, wherein the baffle includes a channel and an opposing channel having opposing orientations, the channel and the opposing channel adapted to attach the baffle to the adjustable cross-member and to attach the baffle to the second adjustable cross-member.

4. The kit, as in claim 1, wherein components of said kit are sized and at a state of disassembly that allows passage of the components into a sump through a manhole.

5. The kit, as in claim 3, wherein the side support and the opposing side support are disposed about a sidewall of a sump.

6. A flow baffle apparatus, comprising:
   a side support securable to a sidewall of a sump;
   a leveling support slideably engaged with the side support to selectively position the support relative to a sump bottom of the sump prior to attachment of the side support to the sidewall;
   an opposing side support securable to the sidewall of the sump;
   a corresponding leveling support slideably engaged with the opposing side support support to selectively position the opposing side support relative to the sump bottom prior to attachment of the opposing side support to the sidewall;
   an adjustable cross-member secured to the side support and secured to the opposing side support to span between the side support and the opposing side support; and
   a baffle of planar configuration attached to the adjustable cross-member so that flow may pass through a gap between the baffle and the sump bottom, the gap being selectable by selectively positioning the side support.

7. The apparatus, as in claim 6, further comprising:
   a second adjustable cross-member secured to the side support and secured to the opposing side support to span between the side support and the opposing side support, the second adjustable cross-member attached to the baffle.

8. The apparatus, as in claim 7, wherein the baffle includes a channel and an opposing channel having opposing orientations with respect to the plane defined by the baffle, the channel adapted to receive the adjustable cross-member to attach the baffle thereto, the opposing channel adapted to receive the second adjustable cross-member to attach the baffle thereto.

9. The apparatus, as in claim 6, further comprising:
   a second baffle attached to the adjustable cross-member adjacent the baffle with a side of the second baffle interfaced with a side of the baffle, the baffle and the second baffle span the sump between the side support and the second side support.

* * * * *